United States Patent
Anand

(10) Patent No.: US 9,344,493 B1
(45) Date of Patent: May 17, 2016

(54) SERVER HEALTH MONITORING FOR TRAFFIC LOAD BALANCER

(71) Applicant: Juniper Networks, Inc., Sunnyvale, CA (US)

(72) Inventor: Vijay Anand, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 238 days.

(21) Appl. No.: 13/939,904

(22) Filed: Jul. 11, 2013

(51) Int. Cl.
*H04L 29/08* (2006.01)
*G06F 9/50* (2006.01)

(52) U.S. Cl.
CPC .......... *H04L 67/1029* (2013.01); *G06F 9/5077* (2013.01); *H04L 67/1008* (2013.01)

(58) Field of Classification Search
CPC ............ H04L 67/1002; H04L 67/1008; G06F 9/5077
See application file for complete search history.

(56) References Cited

U.S. PATENT DOCUMENTS 8,856,319 B1* 10/2014 Huang ................ H04L 67/1002
709/224
2005/0080890 A1* 4/2005 Yang ................... H04L 67/1008
709/223

\* cited by examiner

*Primary Examiner* — Barbara Burgess
(74) *Attorney, Agent, or Firm* — Harrity & Harrity, LLP

(57) ABSTRACT

A device may receive, from a load balancing device, configuration information that identifies a set of nodes for which a status is to be determined. The device may generate a data structure. The data structure may store information that identifies a status of the set of nodes. The device may transmit a status request to one or more nodes. The device may determine the status of the one or more nodes based on transmitting the status request. The device may update the data structure based on determining a change in status of the one or more nodes. The device may provide, to the load balancing device, information that identifies the change in status of the one or more nodes based on updating the data structure.

20 Claims, 14 Drawing Sheets

SERVER HEALTH MONITORING FOR TRAFFIC LOAD BALANCER

BACKGROUND

A load balancing device may be used to distribute workloads between multiple nodes. The load balancing device may include a health monitoring application to determine a status associated with a node (e.g., the availability of the node for receiving workload). The load balancing device may determine the status by periodically probing the node.

SUMMARY

In some implementations, a device may receive, from a load balancing device, configuration information that identifies a set of nodes for which a status is to be determined. The device may generate a data structure. The data structure may store information that identifies a status of the set of nodes. The device may transmit a status request to one or more nodes. The device may determine the status of the one or more nodes based on transmitting the status request. The device may update the data structure based on determining a change in status of the one or more nodes. The device may provide, to the load balancing device, information that identifies the change in status of the one or more nodes based on updating the data structure.

In some implementations, a computer-readable medium may store instructions for causing one or more processors to receive, from a load balancing device, configuration information that identifies a set of nodes for which a status is to be determined. The instructions may further cause the one or more processors to receive information that identifies a status of a node included in the set of nodes. The instructions may further cause the one or more processors to determine a change in the status of the node. The instructions may further cause the one or more processors to update a data structure based on determining the change in status of the node. The data structure may store information that identifies the status of the node. The instructions may further cause the one or more processors to provide, to the load balancing device, information that identifies the change in status of the node based on updating the data structure.

In some implementations, a method may include receiving, by a node management device, configuration information, from a load balancing device, that identifies a set of nodes for which a status is to be determined. The method may further include transmitting, by the node management device, a status request to one or more nodes included in the set of nodes. The method may further include determining, by the node management device, the status of the one or more nodes based on the status request. The method may further include updating, by the node management device, a data structure based on determining a change in the status of the one or more nodes. The data structure may store information associated with the status of the one or more nodes. The method may further include transmitting, by the node management device, information that identifies the change in status of the one or more nodes, to the load balancing device, based on selectively updating the data structure.

DETAILED DESCRIPTION

The following detailed description of example implementations refers to the accompanying drawings. The same reference numbers in different drawings may identify the same or similar elements.

A load balancing device, such as a server, may receive a request for a workload to be distributed, and may distribute the workload to one or more nodes. The load balancing device may include a distribution routine governing how to allocate received requests, and a health monitoring routine for determining the status of the nodes. The status may identify the availability of a node to receive a workload. The load balancing device may periodically probe (e.g., request a response from) a node to determine a change in the status associated with the node. However, the request and response cycle used for determining the status associated with the nodes may involve excessive utilization of resources associated with the load balancing device. Implementations described herein may assist a load balancing device in determining the status of a node by utilizing a dedicated node management device to determine a status of the node, thereby freeing computing resources of the load balancing device.

Figure 1:
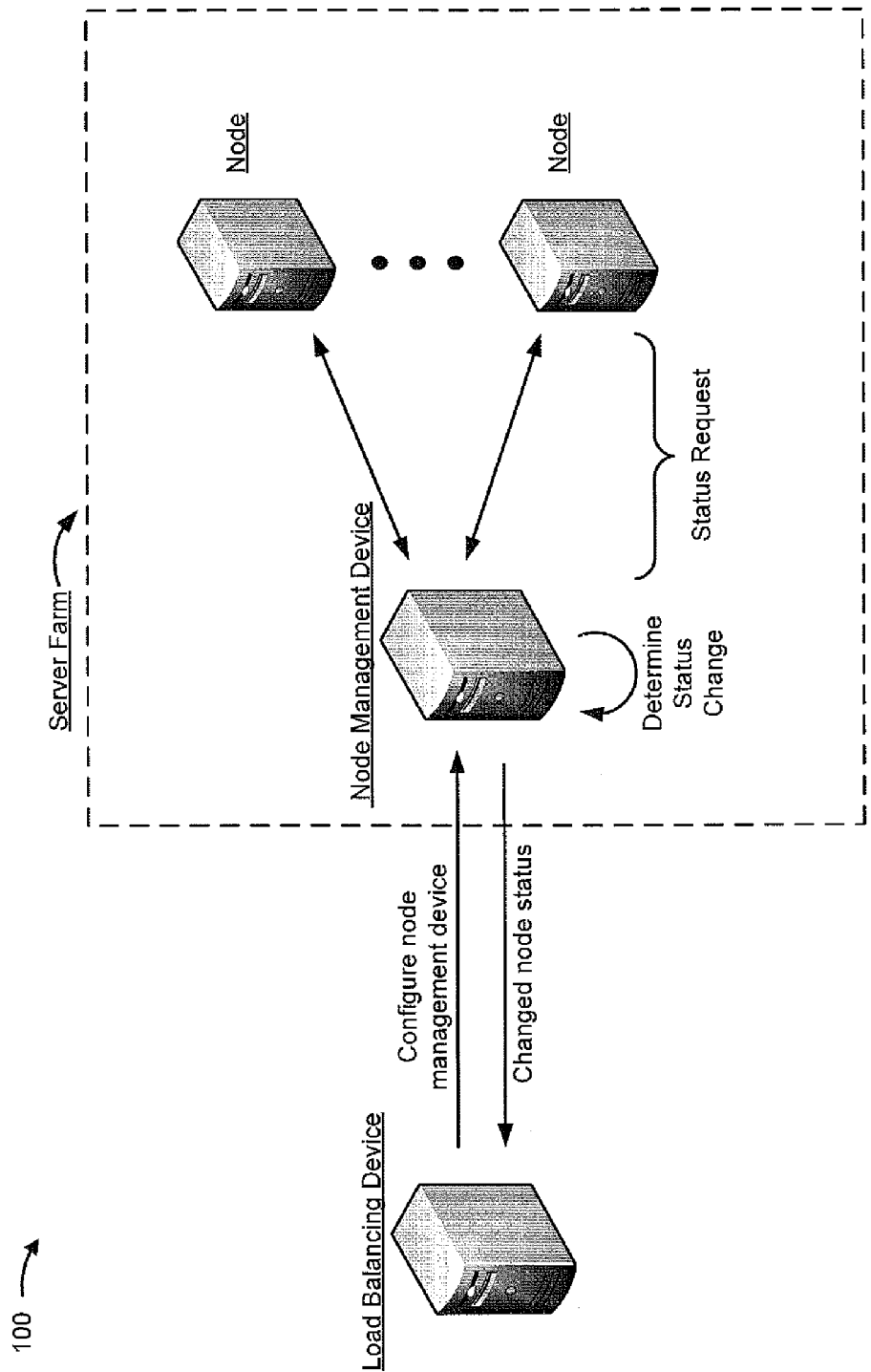
FIG. 1 is a diagram of an overview of an example implementation described herein.

FIG. 1 is a diagram of an overview of an example implementation 100 described herein. As shown in FIG. 1, example implementation 100 may include a load balancing device, a node management device, and one or more nodes. For example, the load balancing device may include a server, a router, or the like. The node management device may include a server, a router, or the like. The one or more nodes may include one or more servers, computer clusters, central processing units, virtual machines, storage devices, or the like. The node management device and the one or more nodes may be located within a server farm (e.g., a server cluster). For example, the server farm may include one or more nodes, a node management device, and associated computing equipment.

As shown in FIG. 1, the node management device may receive a request to configure the node management device from the load balancing device. For example, the load balancing device may determine a configuration parameter, such as an initial configuration parameter (e.g., a node identifier, a status check protocol identifier, etc.), associated with a configuration of the node management device, and may send the configuration parameter to the node management device. The node management device may monitor a status of a node based on the configuration parameter. The node management device may probe (e.g., request a response from) the node to determine the status associated with the node. For example, the node management device may determine that a first node is "UP" (e.g., available for receiving a workload), and may determine that a second node is "DOWN" (e.g., unavailable for receiving a workload).

As further shown in FIG. 1, the node management device may determine a change in the status associated with a node. For example, the node management device may determine that the first node was previously reported as "DOWN" and is now reported as "UP." In this case, the node management device may provide information identifying the change in status to the load balancing device. The load balancing device may then modify a data structure (e.g., a routing table, a routing information base, a forwarding table, a workload management table, etc.) based on the provided information, and may adjust a distribution routine based on the modification of the data structure and/or the change in status. In this way, the load balancing device may monitor the status of one or more nodes through a node management device thereby freeing computing resources of the load balancing device and reduce the amount of communication between the load balancing device and the nodes thereby freeing up network resources.

Figure 2:
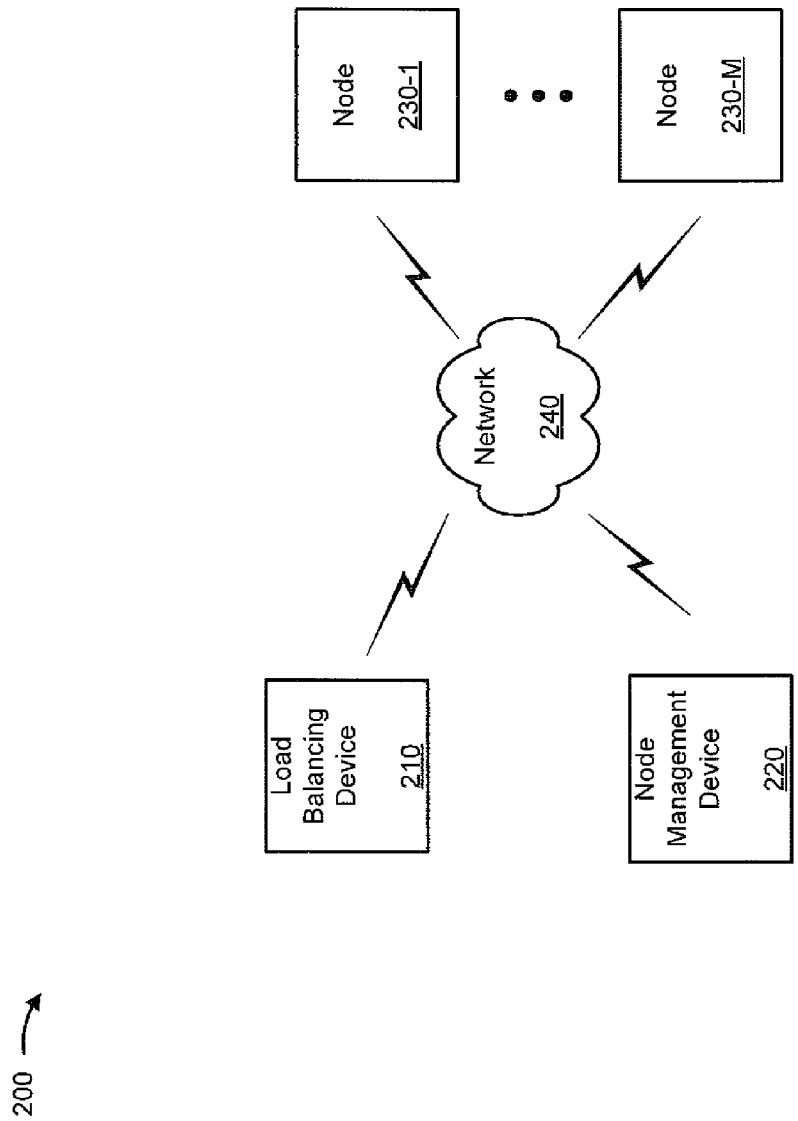
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a load balancing device 210, a node management device 220, one or more nodes 230-1 through 230-M (M≥1) (hereinafter referred to collectively as "nodes 230," and individually as "node 230"), and a network 240. Devices of environment 200 may interconnect via wired connections, wireless connections, or a combination of wired and wireless connections.

Load balancing device 210 may include one or more devices capable of distributing a workload to one or more nodes 230. For example, load balancing device 210 may include a hardware device, such as a server, a router, a hardware load-balancing device ("HLD"), a switch (e.g., a multilayer switch, a content switch, a network switch, a local area network ("LAN") switch, etc.), a gateway (e.g., a residential gateway, a packet gateway, etc.), an application delivery controller ("ADC"), or the like. Additionally, or alternatively, load balancing device 210 may include a device that utilizes a software process, such as a common address redundancy protocol ("CARP"), a network load balancing services ("NLBS") application, a domain name system ("DNS") application, or the like. Workload, as used herein, may refer to a request for usage of a distributed computer resource, such as a processing resource, a transmission resource, a storage resource, or the like. In some implementations, load balancing device 210 may store information that identifies a health status associated with one or more nodes 230.

Node management device 220 may include one or more devices capable of determining the status of one or more nodes 230. For example, node management device 220 may include a hardware device, such as a server, a router, a bridge, a hub, a hardware load-balancing device ("HLD"), a switch (e.g., a multilayer switch, a content switch, a network switch, a local area network ("LAN") switch, etc.), a gateway (e.g., a residential gateway, a packet gateway, etc.), an application delivery controller ("ADC"), or the like. Status, as used herein may refer to a measurement of the performance of a node, such as a node status (e.g., up or down), a central processing unit ("CPU") usage, a memory usage, or the like. In some implementations, node management device 220 may include a node 230 that has been assigned, by load balancing device 210, to monitor the status of other nodes 230. In some implementations, node management device 220 may be capable of sending a status request to node 230 and receiving a status request response from node 230 via network 240. In some implementations, node management device 220 may be described as a primary node management device and/or as a backup node management device.

Node 230 may include one or more devices capable of receiving and/or processing a workload distributed by load balancing device 210. For example, node 230 may include a computer, a computer cluster, a central processing unit ("CPU"), a graphical processing unit ("GPU"), a graphics accelerator processor, a disk drive, a server, a memory unit, a renderer, or the like. In some implementations, one or more nodes 230 may be located within a server farm. In some implementations, node 230 may perform the functions of a primary node management device or of a backup node management device.

Network 240 may include one or more wired and/or wireless networks. For example, network 240 may include a cellular network (e.g., a third generation ("3G") network, a fourth generation ("4G") network, a long term evolution ("LTE") network, etc.), a Wi-Fi network, a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, or a combination of these or other types of networks. In some implementations, load balancing device 210 may communicate with node management device 220 via a first network 240, and node management device 220 may communicate with the one or more nodes 230 via a second network 240. In some implementations, network 240 may be a secured network.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
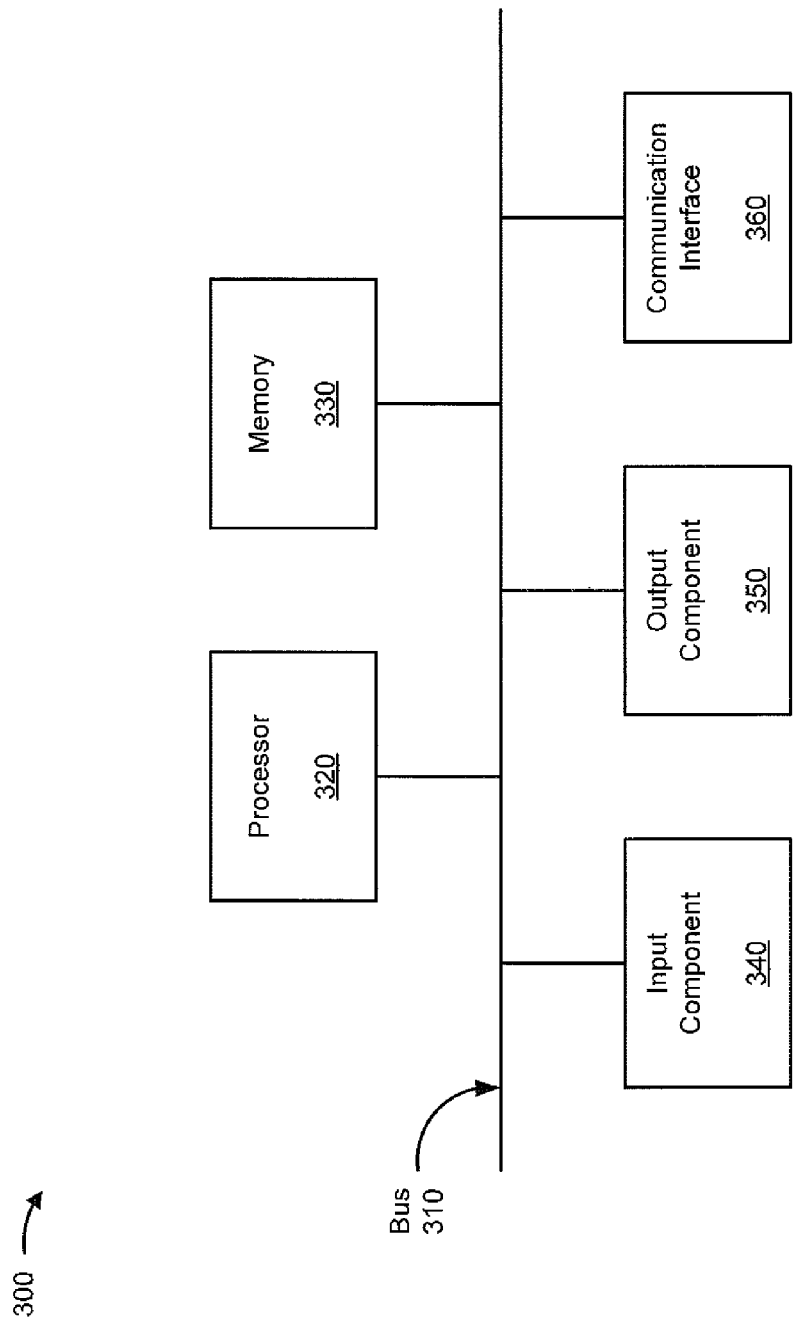
FIG. 3 is a diagram of example components of one or more devices of FIG. 2.

FIG. 3 is a diagram of example components of a device 300. Device 300 may correspond to load balancing device 210, node management device 220, and/or node 230. Additionally, or alternatively, each of load balancing device 210, node management device 220, and/or node 230 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing component (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes ("LEDs"), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency ("RF") interface, a universal serial bus ("USB") interface, a Wi-Fi interface, a cellular network interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3.

Figure 4:
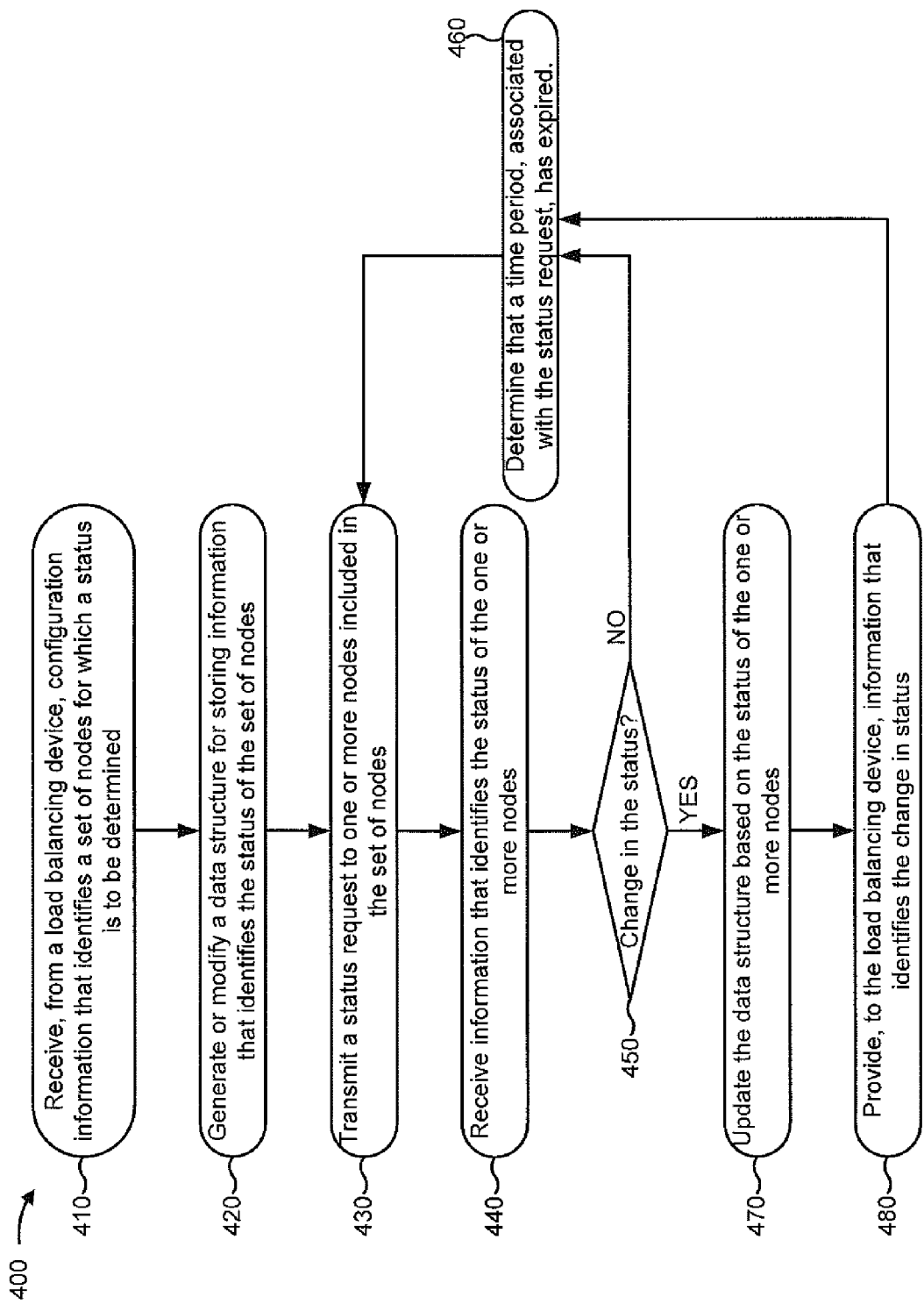
FIG. 4 is a flow chart of an example process for monitoring a status of one or more nodes.

FIG. 4 is a flow chart of an example process 400 for monitoring a status of one or more nodes. In some implementations, one or more process blocks of FIG. 4 may be performed by node management device 220. Additionally, or alternatively, one or more process blocks of FIG. 4 may be performed by another device or a group of devices separate from or including node management device 220, such as load balancing device 210 and/or node 230.

As shown in FIG. 4, process 400 may include receiving, from a load balancing device, configuration information that identifies a set of nodes for which a status is to be determined (block 410). For example, node management device 220 may receive configuration information from load balancing device 210 via network 240. In some implementations, transmission from load balancing device 210 to node management device 220 (e.g., via network 240), may be made via a secured connection. In some implementations, the configuration information may include information that identifies one or more nodes 230 (e.g., a network address, an internet protocol ("IP") address, a virtual IP address, a port identifier, a sub-network identifier, a host identifier, a media access control ("MAC") address, etc.), a status check protocol (e.g., a type of status check to be performed, such as a three-way handshake, a socket check, a port check, a ping, etc.), a status definition (e.g., a type of node status to be checked, such as a CPU load, a memory usage, a bandwidth usage, an online/offline status, etc.), a status check parameter (e.g., a status check interval, a quantity of status check retries, etc.), or the like.

Node management device 220 may receive configuration information from load balancing device 210, in some implementations. For example, load balancing device 210 may query node management device 220 for a status associated with one or more nodes 230, and may include configuration information in the query. Additionally, or alternatively, node management device 220 may store configuration information for retrieval. For example, node management device 220 may store information that identifies a default set of nodes 230 for which a status is to be determined.

Configuration information may identify a primary node management device 220 and a backup node management device 220, in some implementations. For example, a user may specify, and load balancing device 210 may include, information identifying the primary and backup node management devices 220 in the configuration information. Alternatively, the primary node management device 220 and the backup node management device 220 may be determined based on a preset criterion. For example, the configuration information may include an IP address range corresponding to one or more real servers. In this case, the one or more real servers may automatically determine the primary node management device 220 to be the device associated with a highest IP address within the range and the backup node management device 220 to be the device associated with the next highest IP address within the range. Additionally, or alternatively, one or more other techniques may be used to determine the primary node management device 220 and/or the backup node management device 220.

The set of nodes may include one or more nodes 230 for which a status is to be determined, in some implementations. For example, the configuration information may include information identifying one or more nodes 230 for which node management device 220 is to check the status. In some implementations, the set of nodes 230 may include a set of nodes 230 included in a server farm. For example, a configuration request may include information identifying a server farm for which node management device 220 is to check the status. In this case, node management device 220 may check the status of one or more nodes within the server farm. Nodes may be identified individually (e.g., using a network address) and/or as a group (e.g., using a group network address).

The status may include information associated with the availability of a node 230 to receive a workload, such as an online/offline status (e.g., availability to establish a socket connection), a CPU load, a memory usage, a bandwidth usage, a storage usage, a queue length, a wait time, or the like. For example, the configuration information may include information to be used in configuring node management device 220 to determine whether a node is online or offline.

The configuration information may include one or more status check protocols, in some implementations. For example, the configuration information may identify multiple status check protocols, corresponding to multiple status check types that may determine multiple statuses. In this case, node management device 220 may use the multiple status check types to determine multiple statuses for each node 230. Additionally, or alternatively, node management device 220 may use different status check types to determine different statuses for multiple nodes 230.

As shown in FIG. 4, process 400 may include generating or modifying a data structure for storing information that identifies the status of the set of nodes (block 420). For example, node management device 220 may generate or modify the data structure based on the configuration information. In some implementations, the data structure may include information identifying the status of the set of nodes 230. For example, the data structure may include information identifying a set of nodes 230 and information associated with the online/offline status of the set of nodes 230. Additionally, or alternatively, the data structure may include information identifying other status metrics associated with node 230, such as a memory usage, a bandwidth usage, or the like.

Node management device 220 may generate and/or populate a data structure for storing information associated with the status of nodes 230, in some implementations. For example, when node management device 220 is being initially configured, node management device 220 may generate a data structure to store information associated with one or more nodes 230, and may populate the data structure with initial entries (e.g., indicating that the status of one or more nodes is unknown). Additionally, or alternatively, node management device 220 may modify an existing data structure. For example, when node management device 220 receives configuration information identifying a different set of nodes 230 and/or a different protocol than that which was stored in the existing data structure, node management device 220 may modify the data structure based on the configuration information. Additionally, or alternatively, node management device 220 may delete an existing data structure. For example, when changing the status check protocol, node management device 220 may delete the data structure, and may generate a new data structure based on the configuration information identifying the change in the status check protocol.

As shown in FIG. 4, process 400 may include transmitting a status request to one or more nodes included in the set of nodes (block 430). For example, node management device 220 may transmit a status request to node 230 via network 240. In some implementations, the status request may include information identifying a status, associated with node 230, for node 230 to update. For example, a status request may request that node 230 return information associated with the CPU usage of node 230. Node management device 220 may transmit the status request to node 230 via network 240, in some implementations. For example, node management device 220 may transmit a packet as part of a ping test.

A status request may include probing IP connectivity associated with node 230, such as by using a ping test to determine whether node 230 is online or offline, in some implementations. For example, node management device 220 may probe node 230 by sending a quantity of packets to be returned by node 230, and may determine online/offline status based on the results of the probe. In some implementations, node management device 220 may determine a quantity of pings to attempt, when determining online/offline status, based on the received configuration information. For example, node management device 220 may ping node 230 a particular quantity of times, and may determine a particular quantity of lost packets (e.g., more than a threshold identified in the configuration information) before node 230 is determined to be offline. Additionally, or alternatively, a status request may include probing a port, a socket, or the like.

The status request type may be determined based on the status check protocol, in some implementations. For example, the configuration information may include a status check protocol, and node management device 220 may determine a status request type based on the status check protocol. A status check protocol may indicate that the status request is to be performed on node 230 via an IP address check, in some implementations. For example, the status request may include pinging an IP address to determine whether node 230, a node associated with the IP address, is available. Alternatively, a status request protocol may indicate that the status check is to be performed on node 230 via a transmission control protocol ("TCP") check. For example, the status check may include attempting a handshake connection with a particular port to determine if the TCP socket, associated with the port, is available. Alternatively, a status check protocol may indicate that the status check is to be performed on node 230 via the L7 application layer. For example, the status check may include attempting to establish a connection with an application layer process.

Node management device 220 may transmit the status request to node 230 based on the configuration information, in some implementations. For example, the configuration information may identify one or more nodes 230 for which status is to be requested. In some implementations, node management device 220 may determine to transmit a status request to node 230 based on the data structure storing information identifying the status of the set of nodes 230. For example, node management device 220 may determine to transmit a status request to node 230 based on determining that the data structure identifies the status of node 230 as being "UNKNOWN" (e.g., undetermined).

As shown in FIG. 4, process 400 may include receiving information that identifies the status of the one or more nodes (block 440). For example, node management device 220 may receive information associated with the status of the one or more nodes 230 via network 240. In some implementations, the status response may be based on the status check protocol. For example, when the status of node 230 is checked by sending a test packet (e.g., a ping) to node 230, node management device 220 may identify the status of node 230 based on a lack of a response during a period of time. In this case, node management device 220 may determine the status of node 230 to be offline, a port associated with node 230 to be closed, an IP address identifying node 230 to be unresponsive, and/or a socket associated with node 230 to be closed (e.g., "DOWN") based on the lack of response. Alternatively, when node 230 responds to a test packet, node management device 220 may determine the status of node 230 to be online, a port associated with node 230 to be open, an IP address identifying node 230 to be responsive, and/or a socket associated with node 230 to be open (e.g., "UP"). In some implementations, if a period of time has elapsed since the status check without the status being rechecked, node management device 220 may determine the status of node 230 to be unknown (e.g., "UNKNOWN).

As shown in FIG. 4, process 400 may include determining whether the status of a node has changed (block 450). For example, node management device 220 may determine that the status associated with node 230, received based on the status request, is different from the status stored in the data structure. In some implementations, the status may identify a quantity of available resources of node 230. For example, the status may include a CPU usage, a memory usage, a bandwidth usage, or the like. In this case, node management device 220 may determine whether the status has changed based on whether the new status satisfies a threshold level of difference from the prior status stored in the data structure.

As shown in FIG. 4, if the status of a node has not changed, (block 450—NO), then process 400 may include determining that a time period, associated with the status request, has expired (block 460), and transmitting a status request to one or more nodes included in the set of nodes (block 430). For example, node management device 220 may determine that the status has not changed (e.g., a binary status has not changed, a threshold level of status change has not been satisfied, etc.), and may determine a time period after which the status is to be rechecked. Node management device 220 may determine that the time period, associated with rechecking the status, has expired, and may transmit a new status request to node 230, as described herein in connection with block 430.

Node management device 220 may determine the time period based on the configuration information, in some implementations. For example, the configuration information may include information associated with a frequency with which node management device 220 is to check the status of the set of nodes 230. Additionally, or alternatively, node management device 220 may determine the time period based on the status of node 230. For example, node management device 220 may determine a first period of time after which a node 230 with a first status (e.g., online) is to be rechecked, and a second period of time after which a node 230 with a second status (e.g., offline) is to be rechecked. In this case, the first period of time may not be equivalent to the second period of time.

As shown in FIG. 4, if the status of a node has changed, (block 450—YES), then process 400 may include updating the data structure based on the status of the one or more nodes (block 470). For example, node management device 220 may determine that the status associated with node 230 has changed (e.g., a binary status has changed, a threshold level of status change has been satisfied, etc.), and may update the data structure, accordingly. A binary status change, as used herein, may refer to a change from "UP" to "DOWN" (e.g., online to offline), "UP" to "UNKNOWN" (e.g., online to unknown status), "DOWN" to "UP," "DOWN" to "UNKNOWN," "UNKNOWN" to "UP," "UNKNOWN" to "DOWN," or the like.

As shown in FIG. 4, process 400 may include providing, to the load balancing device, information that identifies the change in status (block 480). For example, node management device 220 may provide information identifying the change in status to load balancing device 210 via network 240. In some implementations, the information may identify node 230 and the status associated with node 230. For example, the information may include information identifying node 230, such as a network address, and may include information identifying the status of node 230, such as an online/offline status, a CPU usage, a memory usage, or the like.

Node management device 220 may provide information associated with the status of multiple nodes 230, in some implementations. For example, node management device 220 may determine the status of multiple nodes 230 identified in the set of nodes 230, and may concurrently transmit information identifying multiple nodes 230 for which a change in status was determined. Alternatively, node management device 220 may provide information associated with the status of multiple nodes 230 sequentially (e.g., when the status of node 230 is determined to have changed and before the status of the whole set of nodes 230 has been checked).

Node management device 220 may provide information associated with the status of node 230 for display, in some implementations. For example, node management device 220 may provide information identifying the status of the set of nodes 230 to a display device for display to a user.

Load balancing device 210 may route traffic based on the information identifying the change in status, in some implementations. For example, the information may identify node 230 as offline, and load balancing device 210 may determine not to route traffic to the offline node.

After updating the data structure and/or providing information that identifies the change in status, node management device 220 may determine that a time period associated with the status request has expired, and may transmit a status request to one or more nodes 230, as described herein in connection with blocks 460 and 430. In this way, node management device 220 may periodically determine a status associated with node 230, and may provide the status to load balancing device 210.

Although FIG. 4 shows example blocks of process 400, in some implementations, process 400 may include additional blocks, different blocks, fewer blocks, or differently arranged blocks than those depicted in FIG. 4. Further, one or more of the blocks of process 400 may be omitted in some implementations. Additionally, or alternatively, one or more of the blocks of process 400 may be performed in parallel.

FIGS. 5A-5F are diagrams of an example implementation 500 relating to process 400 shown in FIG. 4. In example implementation 500, node management device 220 may receive configuration information, may determine a status associated with a set of nodes 230, and may transmit the status to load balancing device 210.

Figure 5A:
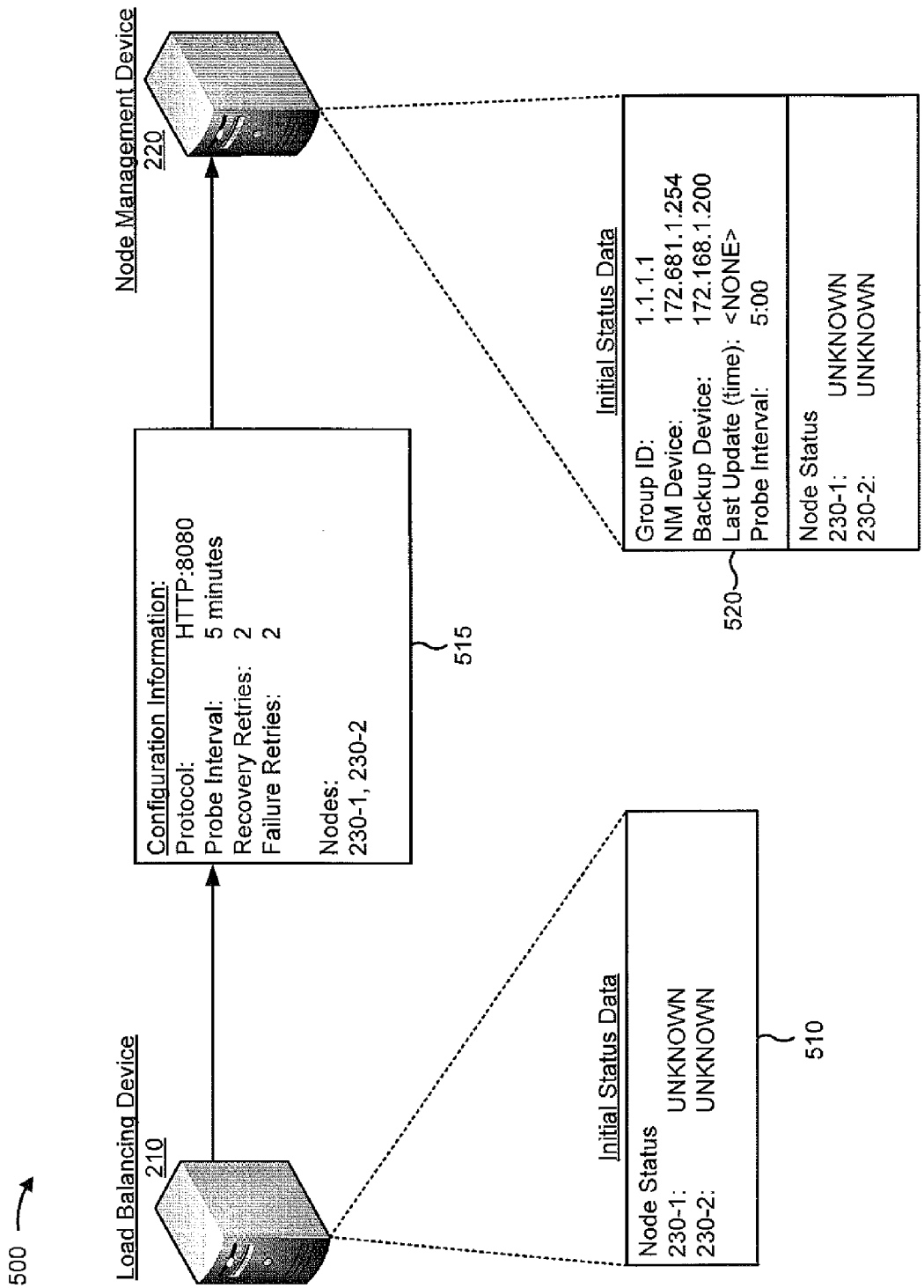
FIGS. 5A-5F are diagrams of an example implementation relating to the example process shown in FIG. 4.

As shown in FIG. 5A, load balancing device 210 may include initial status data, as shown by reference number 510, associated with the status of node 230-1 and node 230-2. As shown by reference number 515, load balancing device 210 transmits configuration information associated with performing a status check. The configuration information identifies a protocol, "HTTP:8080" (e.g., a hypertext transfer protocol ("HTTP") probe, performed on port 8080 that verifies connectivity of a node), a probe interval (e.g., a period of time after which the status of the nodes is to be rechecked), a quantity of recovery retries (e.g., a quantity of retries to be performed by a probe, such as an HTTP probe, before the node is determined to be online), a quantity of failure retries (e.g., a quantity of retries to be performed by a probe before the node is determined to be offline), and a set of nodes 230 (e.g., node 230-1 and node 230-2). The initial status of node 230-1 and node 230-2 is "UNKNOWN."

As shown by reference number 520, node management device 220 receives the configuration information and generates a data structure associated with the status of the set of nodes 230. The data structure includes information associated with performing the status check, such as a group identification, a location of node management device 220 (e.g., an IP address), a location of a backup node management device (e.g., an IP address), an identification of the last time a status check was performed for updating the node status, and a period of time for determining when to retry a status check. As further shown by reference number 520, the initial status of node 230-1 and node 230-2 is set as "UNKNOWN."

Figure 5B:
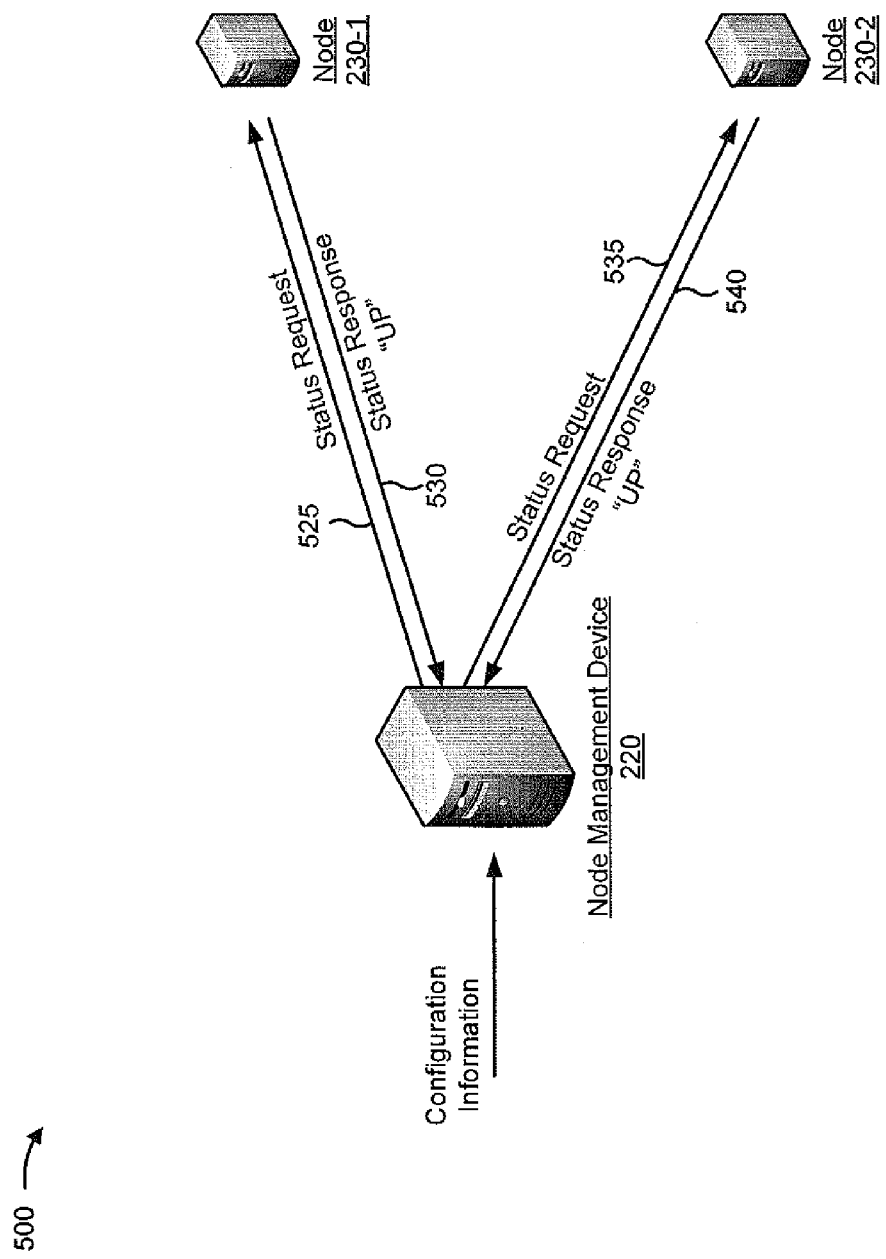

As shown in FIG. 5B, node management device 220 receives the configuration information and determines to check the status of the node 230-1 and node 230-2. As shown by reference number 525, node management device 220 sends a status request to node 230-1. Assume that the status request is an HTTP probe. As shown by reference number 530, node management device 220 receives a status response (e.g., a reply to the HTTP probe), which is shown as "UP" (e.g., online in FIG. 5B). As shown by reference number 535, node management device 220 sends a status request to node 230-2, and as shown by reference number 540, node management device 220 receives a status response, which is shown as "UP" (e.g., online in FIG. 5B).

Figure 5C:
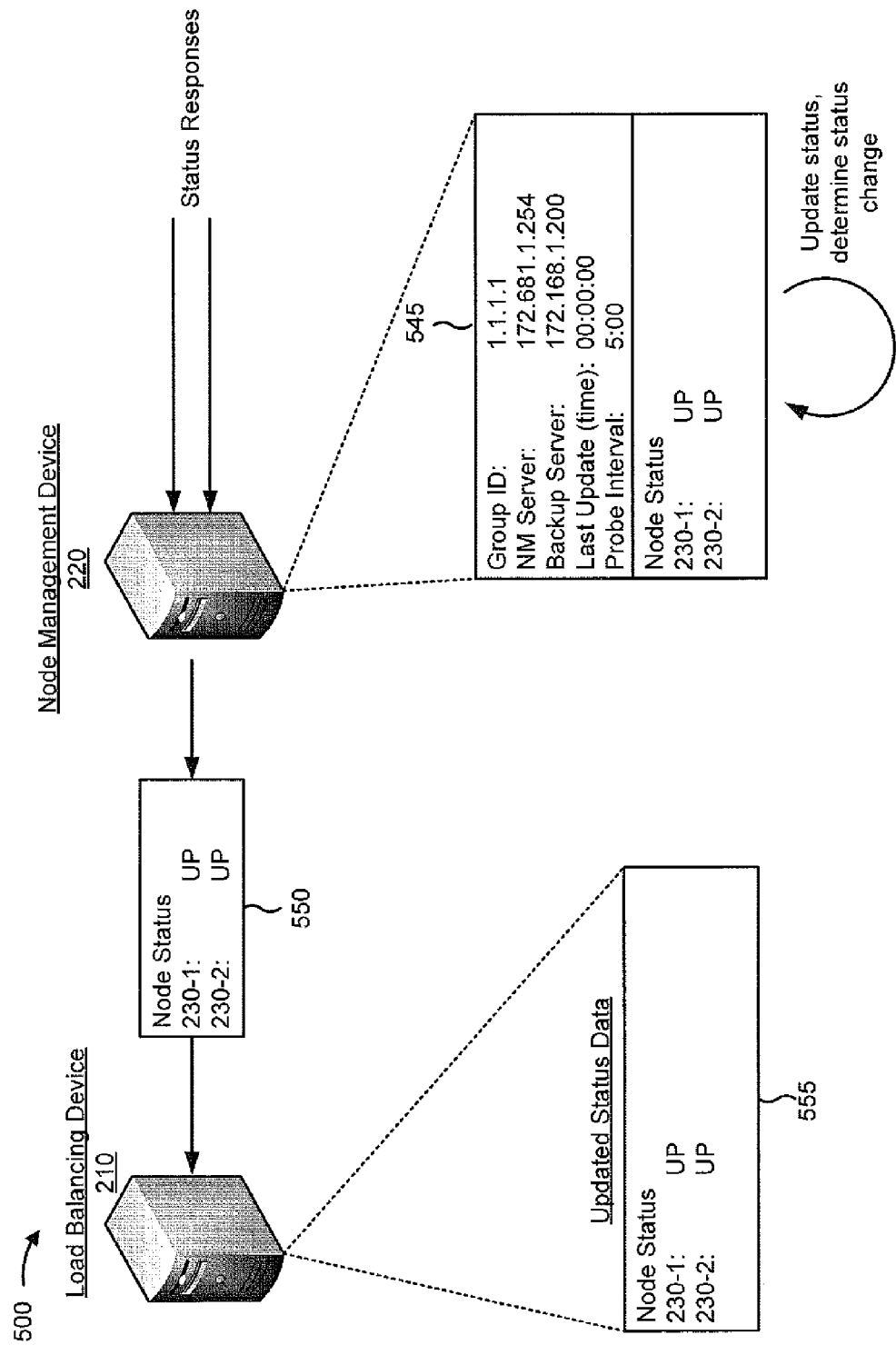

As shown in FIG. 5C, node management device 220 receives the status responses from node 230-1 and node 230-2. As shown by reference number 545, node management device 220 updates the data structure based on the status associated with node 230-1 and node 230-2, "UP" (e.g., online). As further shown by reference number 545, node management device 220 determines that this status update represents a change in status from the previous status (e.g., "UNKNOWN"). As shown by reference number 550, node management device 220 provides the updated status of the set of nodes to load balancing device 210. As shown by reference number 555, load balancing device 210 updates the data structure (e.g., a routing table, a routing information base, a forwarding table, a workload management table, etc.) storing information associated with the status of node 230-1 and node 230-2.

Figure 5D:
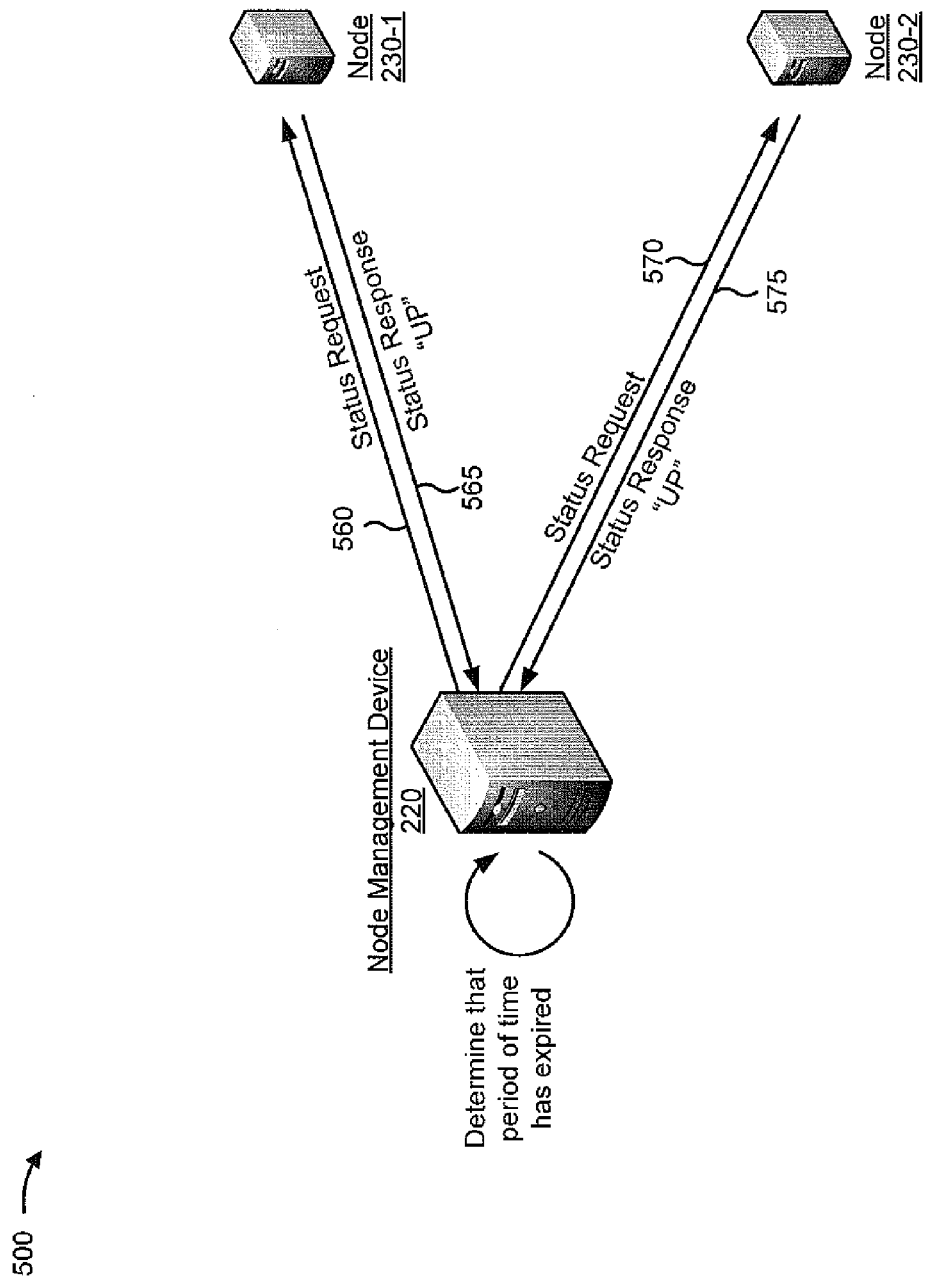

As shown by FIG. 5D, node management device 220 may determine that a period of time, associated with checking the status, has elapsed. Node management device 220 may determine that the period of time has elapsed based on the configuration information, as shown by reference number 515 in connection with FIG. 5A, which included a probe interval of 5 minutes. As shown by reference number 560, node management device 220 sends a status request to node 230-1. As shown by reference number 565, node management device 220 receives a status response, which is shown as "UP" (e.g., online in FIG. 5D). As shown by reference number 570, node management device 220 sends a status request to node 230-2, and as shown by reference number 575, node management device receives a status response, which is shown as "UP" (e.g., online in FIG. 5D).

Figure 5E:
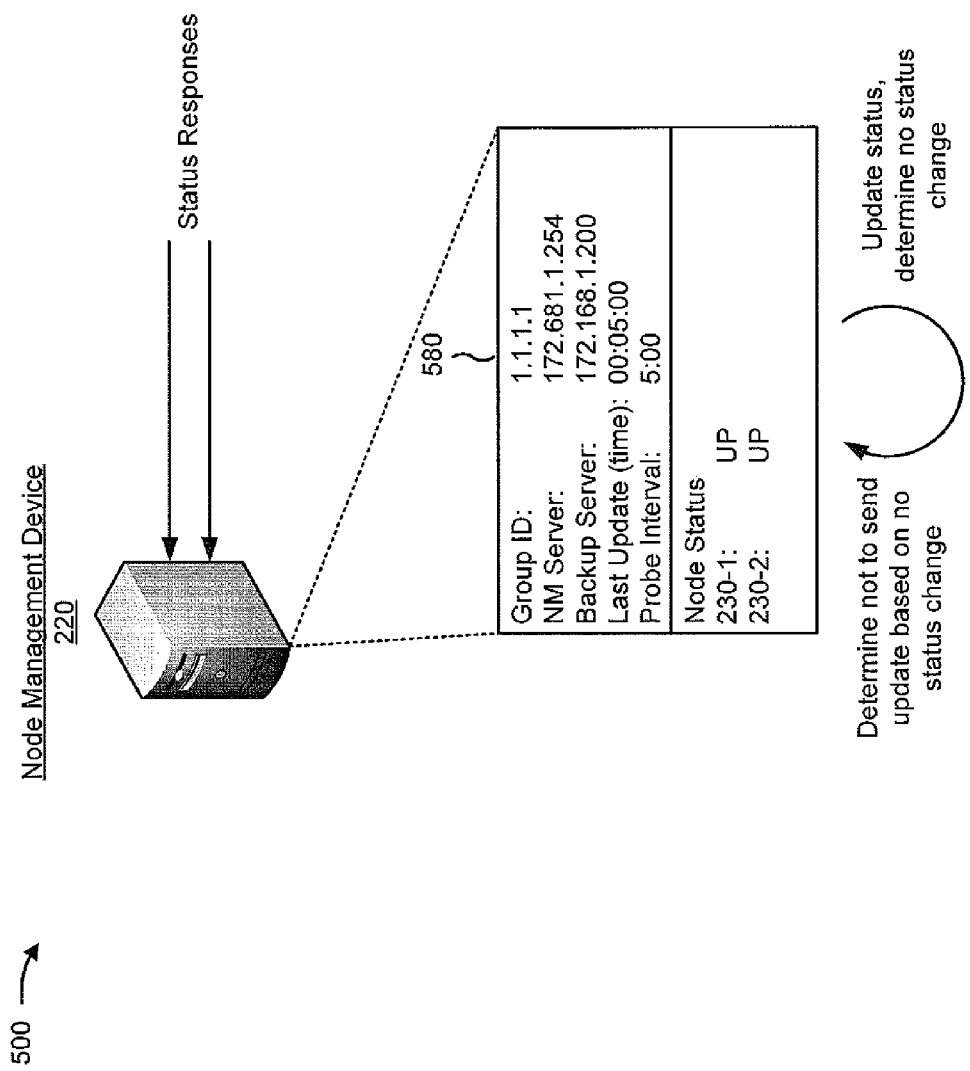

As shown by FIG. 5E, node management device 220 receives the status responses from node 230-1 and node 230-2. As shown by reference number 580, node management device 220 determines not to update the data structure based on the lack of change in the status associated with node 230-1 and node 230-2. Node management device 220 does not send an update to load balancing device 210.

Figure 5F:
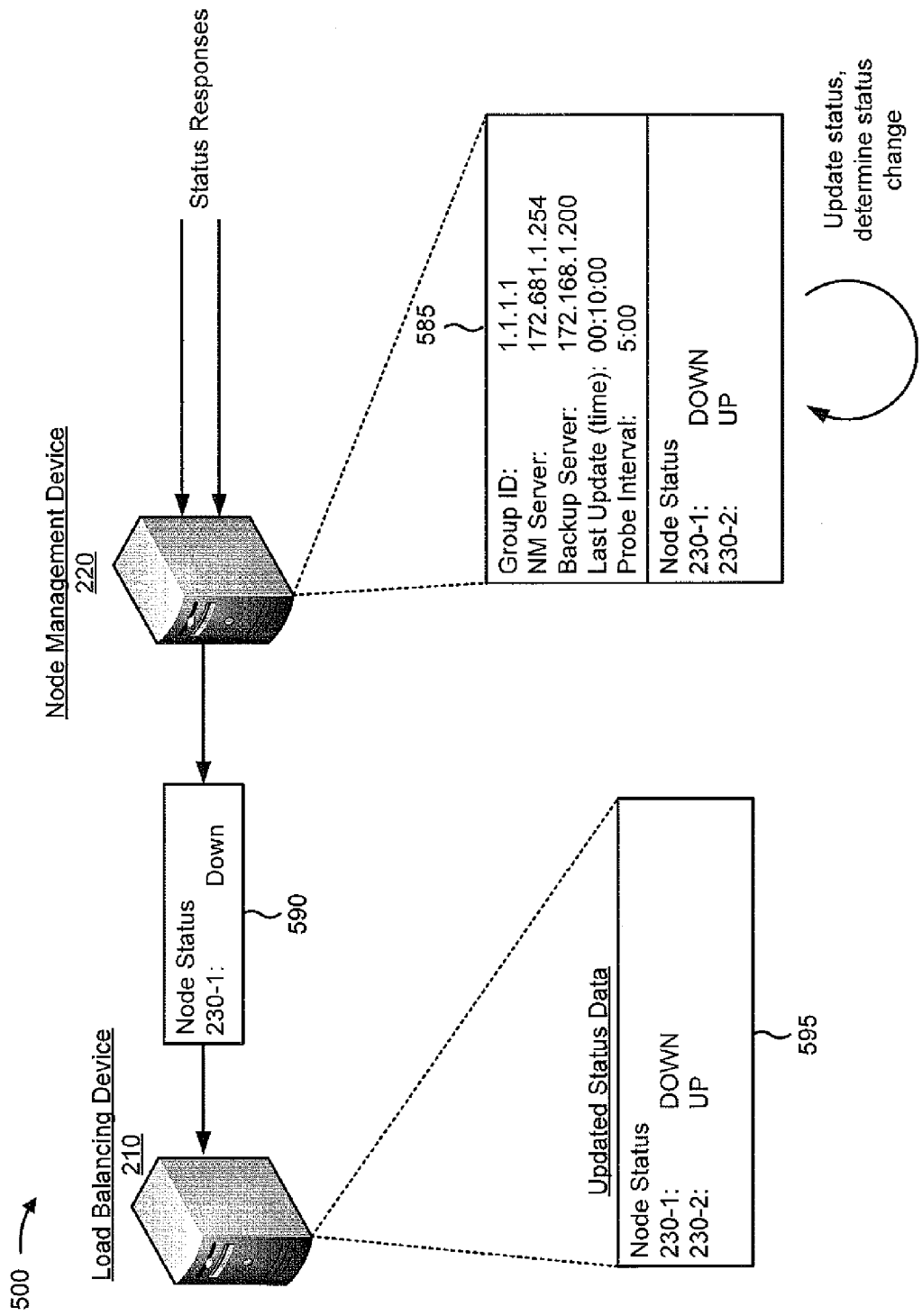

As shown by FIG. 5F, assume that node management device 220 has received another status response associated with node 230-1 and node 230-2 based on rechecking the status of the nodes. Assume that the status associated with node 230-1 is "DOWN" (e.g., offline) and the status associated with node 230-2 is "UP" (e.g., online). As shown by reference number 585, node management device 220 determines that a status of one of the nodes has changed (e.g., node 230-1) and updates the data structure accordingly. As shown by reference number 590, node management device 220 provides the updated status associated with the changed node to load balancing device 210 (e.g., via network 240). As shown by reference number 595, load balancing device 210 updates the data structure storing information associated with the set of nodes.

As indicated above, FIGS. 5A-5F are provided merely as an example. Other examples are possible and may differ from what was described with regard to FIGS. 5A-5F.

Figure 6:
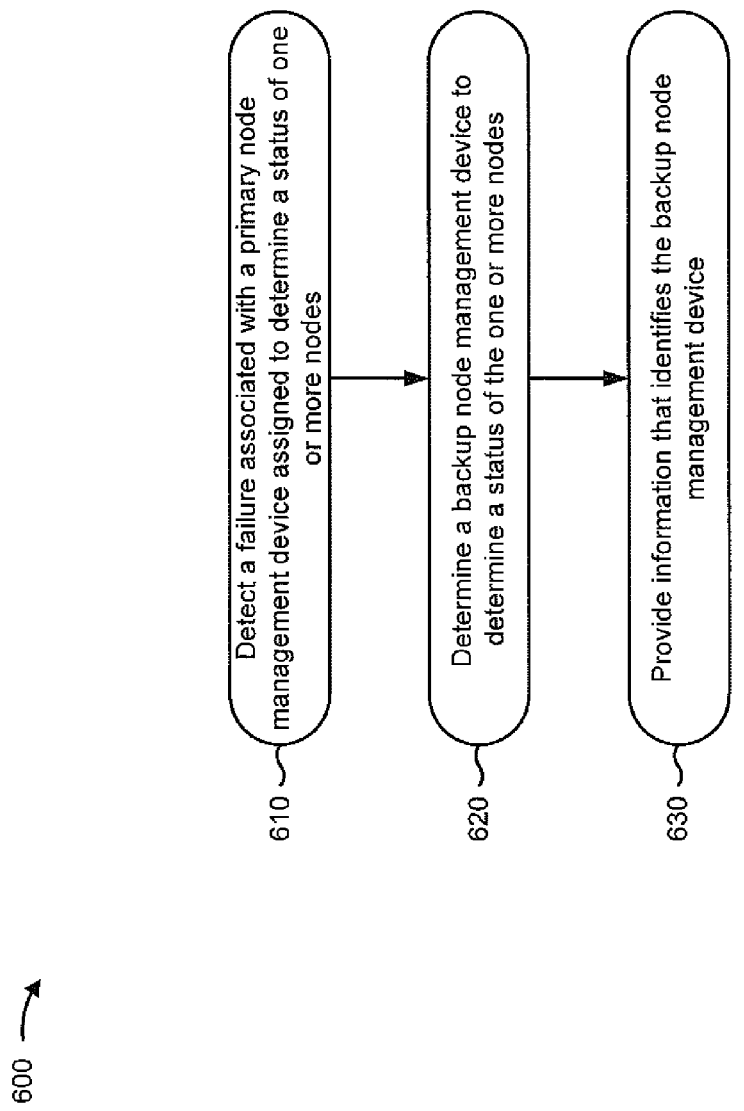
FIG. 6 is a flow chart of an example process for utilizing a backup node management device.

FIG. 6 is a flow chart of an example process 600 for utilizing a backup node management device. In some implementations, one or more process blocks of FIG. 6 may be performed by node management device 220. Additionally, or alternatively, one or more process blocks of FIG. 6 may be performed by another device or a group of devices separate from or including load balancing device 210 and/or node 230.

As shown in FIG. 6, process 600 may include detecting a failure associated with a primary node management device assigned to determine a status of one or more nodes (block 610). For example, backup node management device 220 may detect a failure associated with primary node management device 220.

Backup node management device 220 may detect a failure based on a dropped connection, in some implementations. For example, backup node management device 220 may determine that a connection with primary node management device 220 is no longer active. In some implementations, backup node management device 220 may detect a failure based on information received from load balancing device 210. For example, load balancing device 210 may detect a failure associated with primary node management device 220 and may transmit information alerting backup node management device 220 to the failure.

A failure, as used herein, may include an inability to determine and/or transmit status updates, such as a dropped connection (e.g., with load balancing device 210, with one or more nodes 230, etc.), a loss of power, a crash (e.g., a freeze, a hang, etc.), or the like.

Load balancing device 210 and/or backup node management device 220 may perform periodic status checks to determine whether primary node management device 220 is online or offline, using, for example, techniques similar to techniques described in connection with FIG. 4. The interval for the periodic status checks may be identified based on configuration information, which may be sent to both primary node management device 220 and backup node management device 220. In some implementations, the configuration information may identify the primary node management device and one or more backup node management devices 220. Alternatively, primary node management device 220 and backup node management device 220 may be determined automatically based on an IP address, a random selection, a preset determination procedure, or the like.

As shown in FIG. 6, process 600 may include determining a backup node management device to determine a status of the one or more nodes (block 620). For example, backup node management device 220 may determine to check the status of the one or more nodes 230, based on detecting a failure of primary node management device 220. In some implementations, load balancing device 210 may determine a device to act as the backup node management device 220, based on detecting a failure associated with primary node management device 220. For example, load balancing device 210 may determine, based on a preset configuration, that node 230, associated with the next sequential IP address after the IP address associated with primary node management device 220, is to be assigned as the backup node management device 220.

As shown in FIG. 6, process 600 may include providing information that identifies the backup node management device (block 630). For example, backup node management device 220 may provide information to load balancing device 210, indentifying backup node management device 220 as the device for determining the status of one or more nodes 230, as discussed herein in conjunction with FIG. 4. In some implementations, the provided information may include information identifying a network address associated with backup node management device 220. For example, backup node management device 220 may transmit, to load balancing device 210, information associated with an IP address, a port, a MAC address, or the like. In this case, load balancing device 210 may utilize the provided information to send configuration information to backup node management device 220. In this way, backup node management device 220 may take over performing status checks from primary node management device 220 when primary node management device 220 undergoes failure.

Although FIG. 6 shows example blocks of process 600, in some implementations, process 600 may include additional blocks, different blocks, fewer blocks, or differently arranged blocks than those depicted in FIG. 6. Further, one or more of the blocks of process 600 may be omitted in some implementations. Additionally, or alternatively, one or more of the blocks of process 600 may be performed in parallel.

Figure 7A:
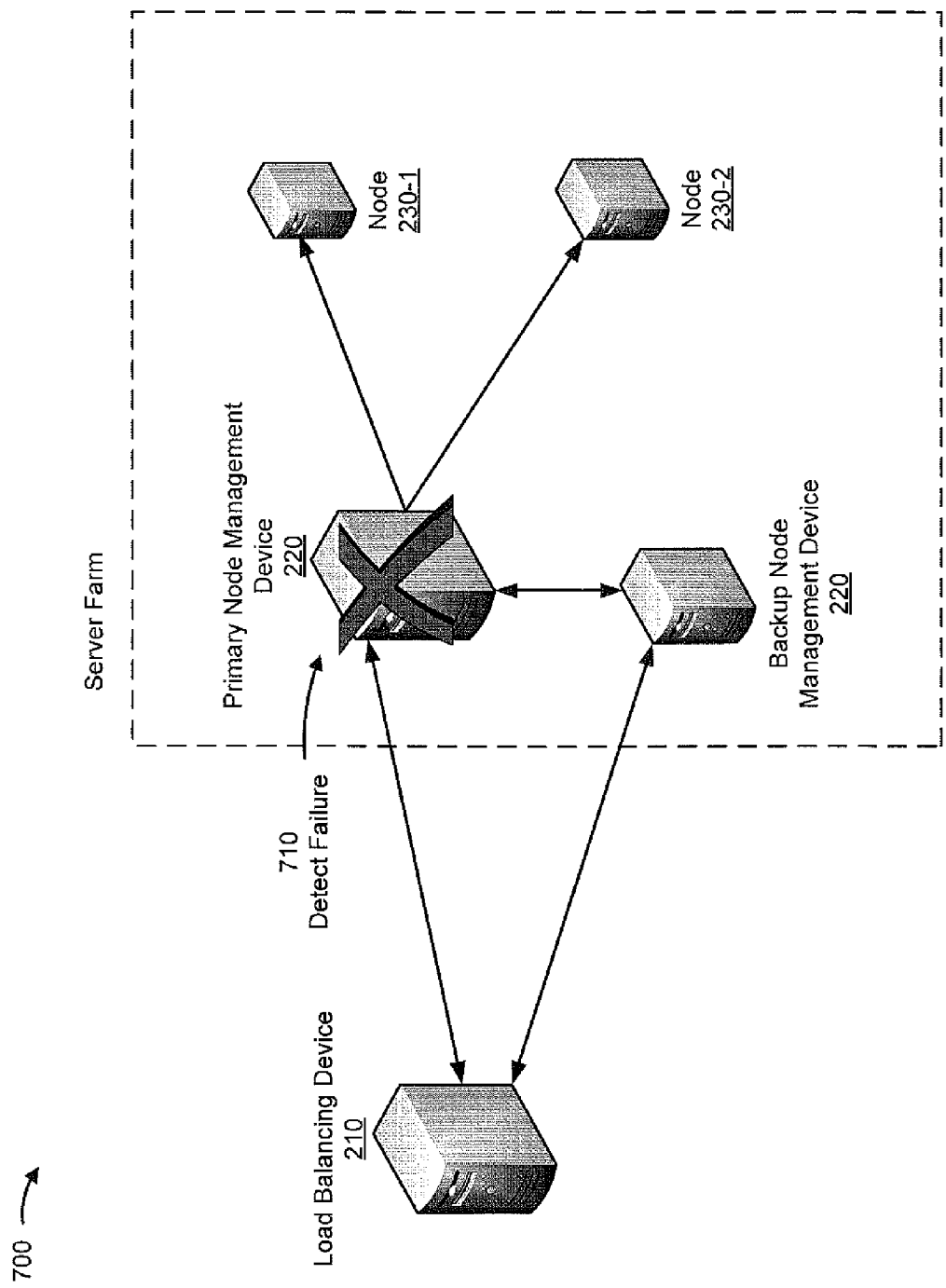
FIGS. 7A-7C are diagrams of an example implementation relating to the example process shown in FIG. 6.
Figure 7B:
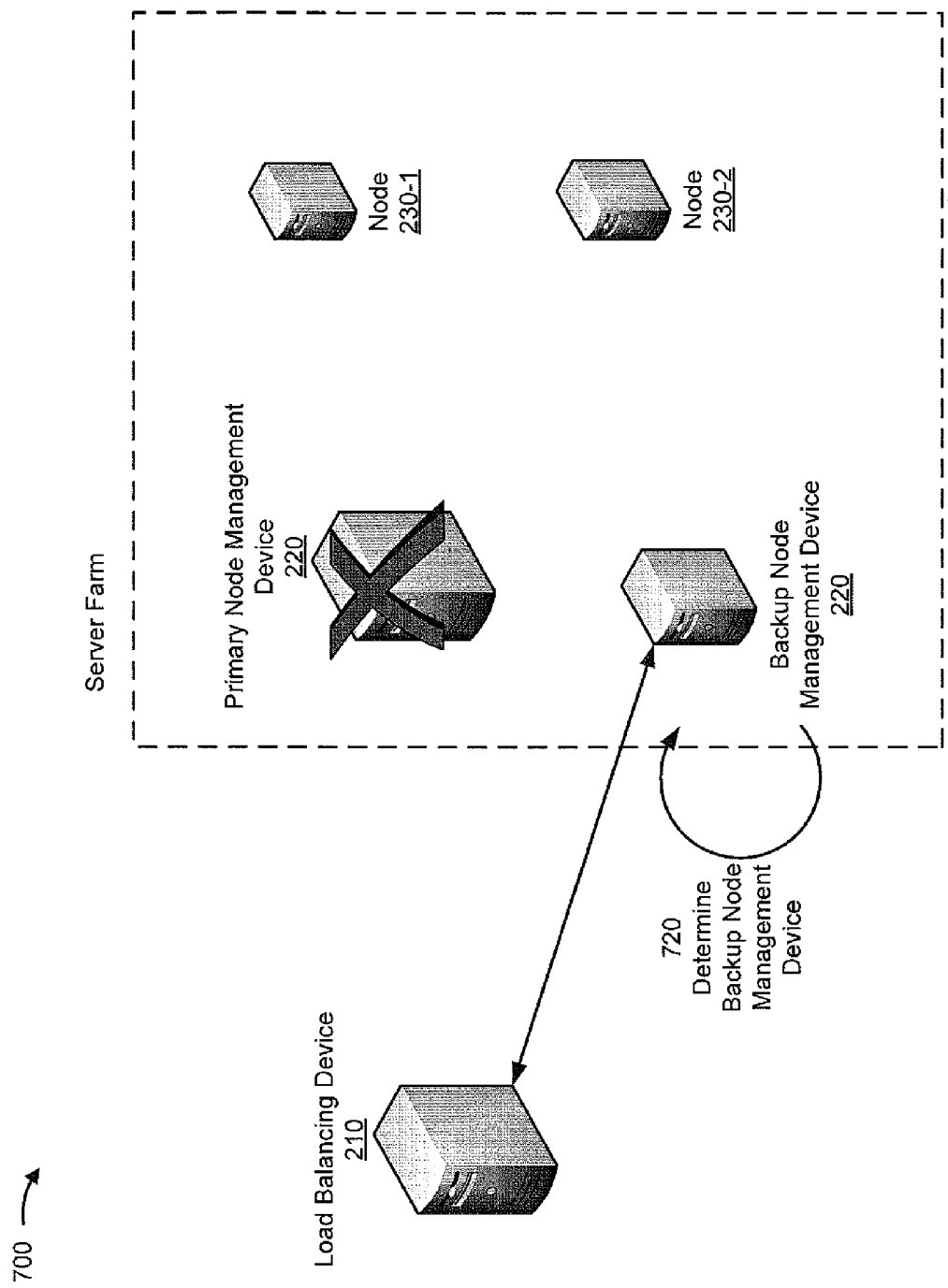
Figure 7C:
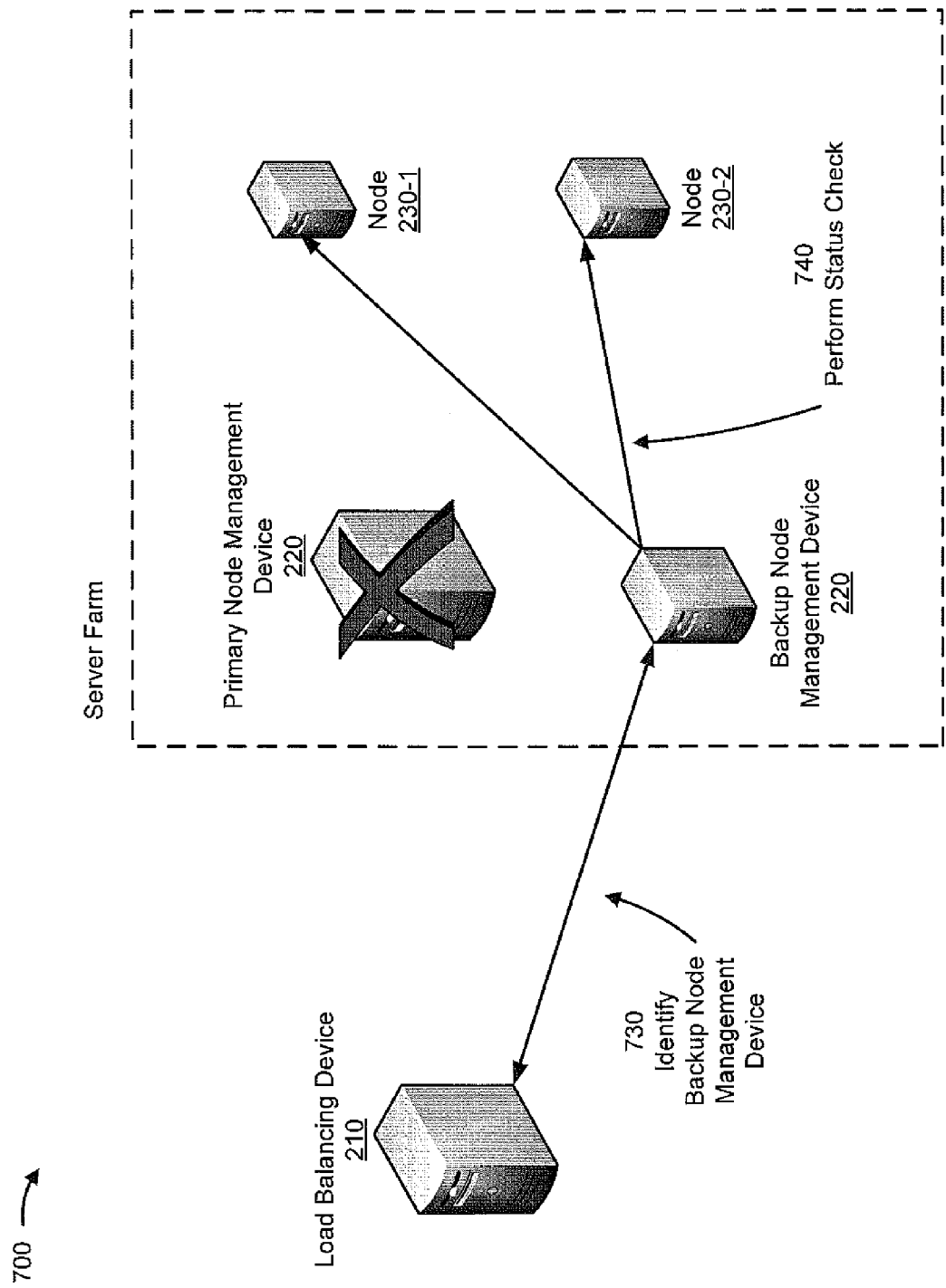

FIGS. 7A-7C are diagrams of an example implementation 700 relating to process 600 shown in FIG. 6. Example implementation 700 includes a load balancing device 210, a primary node management device 220, a node 230-1, a node 230-2, and a backup node management device 220. Assume that primary node management device 220, node 230-1, node 230-2, and backup node management device 220 are contained within a server farm.

As shown in FIG. 7A, load balancing device 210 is connected to primary node management device 220 and backup node management device 220 (e.g., via network 240). Primary node management device 220 is connected to backup node management device 220, node 230-1, and node 230-2. As shown by reference number 710, assume that backup node management device 220 detects a failure associated with primary node management device 220.

As shown in FIG. 7B, primary node management device 220 has failed and has dropped a connection to other devices. As shown by reference number 720, backup node management device 220 may determine that backup node management device 220 is the backup node management device associated with the server farm.

As shown in FIG. 7C, backup node management device 220 has connected to node 230-1 and node 230-2. As shown by reference number 730, backup node management device 220 provides information identifying itself to load balancing device 210 as the backup node management device for the server farm. As shown by reference number 740, backup node management device 220 takes over, from the primary node management device 220, the performance of a status check on node 230-1 and node 230-2.

As indicated above, FIGS. 7A-7C are provided merely as an example. Other examples are possible and may differ from what was described with regard to FIGS. 7A-7C.

Implementations described herein may allow a node management device to perform status checks indicating the status of nodes, and may allow a backup node management device to replace the node management device in the event of a failure of the node management device. Furthermore, implementations described herein may reduce the amount of communication between a load balancing device and the nodes, thus freeing up computing resources associated with the load balancing device and network resources associated with a network.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in conjunction with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
   one or more processors to:
   receive, from a load balancing device, configuration information that identifies a set of nodes for which a status is to be determined;
   determine a backup node management device based on the configuration information,
      the backup node management device being selected from the set of nodes for which the status is to be determined,
      the device being associated with a highest Internet Protocol (IP) address within a range of IP addresses, and
      the backup node management device being associated with a next highest IP address within the range of IP addresses;
   provide the configuration information to the backup node management device;
   generate a data structure,
      the data structure storing information that identifies the status of the set of nodes;
   transmit a status request to one or more nodes included in the set of nodes;
   determine a change in the status of the one or more nodes based on transmitting the status request;
   update the data structure based on determining the change in the status of the one or more nodes; and
   provide, to the load balancing device, information that identifies the change in the status of the one or more nodes based on updating the data structure.

2. The device of claim 1,
   where the one or more processors are further to:
   determine that a time period, associated with the status request, has expired; and
   where the one or more processors, when transmitting the status request to the one or more nodes included in the set of nodes, are to:
   transmit the status request based on determining that the time period has expired.

3. The device of claim 1, where the status, for a node of the one or more nodes, indicates at least one of:
   an online status indicating that the node is available for receiving a workload;
   an offline status indicating that the node is unavailable for receiving a workload;

an unknown status indicating that the status of the node is not known;
a quantity of computer processing unit usage associated with the node;
a quantity of memory usage associated with the node;
a quantity of bandwidth usage associated with the node;
a queue length associated with a queue of the node; or
a delay time associated with processing a workload by the node.

4. The device of claim 1,
where the one or more nodes correspond to a plurality of nodes,
where the one or more processors, when determining the change in the status of the one or more nodes, are to:
determine a plurality of statuses associated with the plurality of nodes;
determine that the plurality of statuses associated with the plurality of nodes changed; and
where the one or more processors, when providing the information that identifies the change in the status, are to:
concurrently provide information that identifies the change in the plurality of statuses associated with the plurality of nodes.

5. The device of claim 1, where, when determining the change in the status, the one or more processors are to:
determine a time period associated with transmitting the status request;
determine that a response to the status request has not arrived within the time period;
determine that a node, of the one or more nodes, is offline based on determining that the response to the status request has not arrived within the time period; and
determine the change in the status based on determining that the node is offline.

6. The device of claim 1,
where the one or more processors are further to:
determine a status check protocol based on the configuration information; and
where the one or more processors, when transmitting the status request, are to:
transmit the status request based on the status check protocol.

7. A non-transitory computer-readable medium storing instructions, the instructions comprising:
one or more instructions that, when executed by one or more processors of a device, cause the one or more processors to:
receive, from a load balancing device, configuration information that identifies a set of nodes for which one or more statuses are to be determined;
determine a backup node management device based on the configuration information,
the backup node management device being selected from the set of nodes for which the status is to be determined,
the device being associated with a highest Internet Protocol (IP) address within a range of IP addresses, and
the backup node management device being associated with a next highest IP address within the range of IP addresses;
provide the configuration information to the backup node management device;
receive information that identifies a status of a node, the node being included in the set of nodes, and the one or more statuses including the status;
determine a change in the status of the node;
update a data structure based on determining the change in the status of the node,
the data structure storing information that identifies the status of the node; and
provide, to the load balancing device, information that identifies the change in the status of the node based on updating the data structure.

8. The non-transitory computer-readable medium of claim 7,
where the one or more instructions that, when executed by the one or more processors, further cause the one or more processors to:
determine that a time period, associated with receiving the information that identifies the status of the node, has expired; and
determine a new status, associated with the node, based on determining that the time period has expired; and
where the one or more instructions, that cause the one or more processors to determine the change in the status of the node, cause the one or more processors to:
determine the change in the status of the node based on the new status.

9. The non-transitory computer-readable medium of claim 7,
where the information that identifies the status of the node is status information;
where the one or more instructions that, when executed by the one or more processors, further cause the one or more processors to:
determine a status check protocol, associated with receiving the status information, based on the configuration information; and
where the one or more instructions, that cause the one or more processors to receive the status information, further cause the one or more processors to:
receive the status information based on the status check protocol.

10. The non-transitory computer-readable medium of claim 7,
where the information that identifies the status of the node is status information;
where the one or more instructions that, when executed by the one or more processors, further cause the one or more processors to:
determine a time period associated with receiving the status information that identifies the status of the node,
determine that the status information that identifies the status of the node has not been received within the time period; and
determine that the node is offline based on determining that a response to a request for the status information has not been received within the time period; and
where the one or more instructions, that cause the one or more processors to determine the change in the status of the node, cause the one or processors to:
determine the change in the status of the node based on determining that the node is offline.

11. The non-transitory computer-readable medium of claim 7, where the one or more instructions, that cause the one or more processors to receive the configuration information, cause the one or more processors to:
receive the configuration information identifying the set of nodes and a backup node management device; and transmit the configuration information to the backup node management device based on the configuration information identifying the backup node management device.

12. The non-transitory computer-readable medium of claim 7,
where the one or more instructions, that cause the one or more processors to receive the configuration information, cause the one or more processors to:
receive the configuration information identifying a server farm,
the server farm including the node;
determine information identifying the node based on the information identifying the server farm; and
transmit a status request to the node; and
where the one or more instructions, that cause the one or more processors to receive the information that identifies the status of the node, cause the one or more processors to:
receive the information that identifies the status of the node based on transmitting the status request to the node.

13. The non-transitory computer-readable medium of claim 12,
where the one or more instructions that, when executed by the one or more processors, further cause the one or more processors to:
determine a period of time associated with transmitting a status request has expired; and
determine that the period of time has expired; and
where the one or more instructions, that cause the one or more processors to transmit the status request to the node, cause the one or more processors to:
transmit the status request to the node based on determining that the period of time has expired.

14. A method, comprising:
receiving, by a node management device and from a load balancing device, configuration information that identifies a set of nodes for which a status is to be determined;
determining a backup node management device based on the configuration information,
the backup node management device being selected from the set of nodes for which the status is to be determined,
the node management device being associated with a highest Internet Protocol (IP) address within a range of IP addresses, and
the backup node management device being associated with a next highest IP address within the range of IP addresses;
providing the configuration information to the backup node management device;
transmitting, by the node management device, a status request to one or more nodes included in the set of nodes;
determining, by the node management device, a change in the status of the one or more nodes based on transmitting the status request;
updating, by the node management device, a data structure based on determining the change in the status of the one or more nodes,
the data structure storing information associated with the status of the one or more nodes; and
transmitting, by the node management device and to the load balancing device, information that identifies the change in the status of the one or more nodes based on updating the data structure.

15. The method of claim 14, further comprising:
determining that a time period, associated with the status request, has expired,
where transmitting the status request to the one or more nodes further comprises:
transmitting the status request based on determining that the time period has expired.

16. The method of claim 14,
where the one or more nodes correspond to a plurality of nodes, and
where determining the change in the status comprises:
determining a plurality of statuses associated with the plurality of nodes; and
determining that the plurality of statuses associated with the plurality of nodes changed.

17. The method of claim 14, further comprising:
determining, based on the configuration information, a plurality of status check protocols associated with the one or more nodes,
where transmitting the status request further comprises:
transmitting the status request based on the plurality of status check protocols.

18. The method of claim 14, where determining the change in the status comprises:
determining a period of time associated with determining the status of a node,
the node being one of the one or more nodes;
determining that the period of time has elapsed without the status request being performed on the node;
determining the status of the node to be unknown based on the period of time having elapsed; and
determining the change in status of the one or more nodes based on determining the status of the node to be unknown.

19. The method of claim 14,
where transmitting the status request comprises:
transmitting a packet to a port address of a port,
the port address being associated with a node of the one or more nodes; and
receiving a response to the transmitted packet from the node; and
where determining the change in the status of the one or more nodes comprises:
determining the status of the node, associated with the port, to be open based on the response.

20. The method of claim 14, where the configuration information further identifies at least one of a status check protocol or a type of node status to be checked.

* * * * *